(12) United States Patent
Choi

(10) Patent No.: US 9,067,781 B2
(45) Date of Patent: Jun. 30, 2015

(54) METHOD OF CONTROLLING ASPECT RATIO OF NANO-STRUCTURE, METHOD OF PRODUCING NANO-STRUCTURE USING THE SAME AND NANO-STRUCTURE PRODUCED THEREBY

(75) Inventor: Shin Jung Choi, Chungcheongnam-do (KR)

(73) Assignee: CORNING PRECISION MATERIALS CO., LTD., Asan-Si, Chungcheongnam-Do (KR)

( * ) Notice: Subject to any disclaimer, the term of this patent is extended or adjusted under 35 U.S.C. 154(b) by 638 days.

(21) Appl. No.: 13/449,146

(22) Filed: Apr. 17, 2012

(65) Prior Publication Data

US 2012/0282164 A1 Nov. 8, 2012

(30) Foreign Application Priority Data

May 2, 2011 (KR) .......................... 10-2011-0041509

(51) Int. Cl.
*C01G 45/12* (2006.01)
*B82Y 30/00* (2011.01)
*B82Y 40/00* (2011.01)
*C01G 45/02* (2006.01)

(52) U.S. Cl.
CPC ................. *B82Y 30/00* (2013.01); *B82Y 40/00* (2013.01); *C01G 45/02* (2013.01); *C01G 45/1228* (2013.01); *C01P 2002/72* (2013.01); *C01P 2004/03* (2013.01)

(58) Field of Classification Search
CPC .. C01G 45/006; C01G 45/02; C01G 45/1228; C01G 45/1242; B82Y 30/00; B82Y 40/00; H01M 4/0497; H01M 4/50; H01M 4/505; C30B 7/10; C01P 2004/16; C01P 2004/54; C01P 2004/64; C01P 2002/72; C01P 2006/12
USPC ............... 252/182.1, 519.1, 519.15; 423/599, 423/605, 49, 50; 429/218.1, 224, 231.1, 429/231.95; 427/212, 215; 977/811, 896, 977/949
See application file for complete search history.

(56) References Cited

U.S. PATENT DOCUMENTS 6,162,530 A * 12/2000 Xiao et al. ................. 428/292.1
2010/0278720 A1 11/2010 Wong et al.

FOREIGN PATENT DOCUMENTS

KR 2010-0094900 A 8/2010

OTHER PUBLICATIONS

Kim et al, "Spinel LiMn2O4 Nanorods as Lithium Ion Battery Cathodes", Nano Letfers, 2008, vol. 8, No. 11, pp. 3948-3952.*
Liu et al, "Synthesis, characterization and magnetic properties of beta-MnO2 nanorods," Powder Technology. t54 (2005) t20-124.*
Korean Office Action issued in Korean Patent Application No. KR 10-2011-0041509 dated Feb. 12, 2013.
* cited by examiner

*Primary Examiner* — Colleen Dunn
(74) *Attorney, Agent, or Firm* — McDermott Will & Emery LLP

(57) ABSTRACT

Provided are a method of easily controlling the aspect ratio of a nano-structure, which can be effectively used in various fields of application, including a positive active material for a rechargeable battery, an electrode material for a storage battery, a redox catalyst, a molecule support, and so on, and by which various nano-structures of desired sizes can be easily produced according to the necessity. The method includes preparing a mixed solution including a manganese salt and an oxidant, adding a pH controlling additive to the mixed solution and controlling a pH level of the mixed solution using the following equation, and heating the pH-controlled mixed solution at a temperature in a range of 50☐ to 200☐ for 1 hour to 10 days to cause a reaction to take place:

Specific surface area $(m^2/g) = 0.2\ pH^2 + 2$.

9 Claims, 6 Drawing Sheets

Specific surface area $(m^2/g) = 0.2\ pH^2 + 2$

Specific surface area (m²/g) = 0.2 pH² + 2

METHOD OF CONTROLLING ASPECT RATIO OF NANO-STRUCTURE, METHOD OF PRODUCING NANO-STRUCTURE USING THE SAME AND NANO-STRUCTURE PRODUCED THEREBY

CROSS-REFERENCE TO RELATED APPLICATION

This application claims priority to and the benefit of Korean Patent Application No. 10-2011-0041509, filed on May 2, 2011, the entire content of which is incorporated herein by reference.

BACKGROUND OF THE INVENTION

1. Field of the Invention

The present invention relates to a method of controlling the aspect ratio of a nano-structure, a method of producing a nano-structure using the same and a nano-structure produced thereby. More particularly, the present invention relates to a method of easily controlling the aspect ratio of a nano-structure, which can be effectively used in various fields including a positive active material for a rechargeable battery, an electrode material for a storage battery, a redox catalyst, a molecule support, and so on, and, and by which various nano-structures of desired sizes can be easily produced according to the necessity.

2. Description of the Related Art

As the market in fields of cellular phones, notebook computers, electric cars, and so on, is on the rise, energy storage technology is gradually gaining attention.

Accordingly, electrochemical devices have gained highest attention, and major part of the electrochemical devices includes rechargeable batteries and capacitors. In order to improve the capacity and commercial viability of the electrochemical devices, active research into new material and design is under way. Currently commercially developing batteries include Ni-MH, Ni—Cd, Pb—$PbSO_4$, lithium ion batteries, and so on.

Specifically, lithium ion batteries are drawing attention owing to their various advantages, including a high operation voltage and high energy density, and the market of the lithium ion batteries is gradually expanding.

According to expansion of the lithium ion battery market, serious problems are encountered, including the sharp increase in prices of cobalt that is the most desirable positive electrode material and environmental pollution caused by cobalt. Under the circumstances, research into alternative materials is intensively conducted. In addition, particle sizes of metal oxide used as an electrode of a battery are reduced to a nanometer scale, a surface area of the metal oxide is increased, the charging/discharging speed and capacity of the battery can be increased, efforts to synthesize nano-scale electrode materials have continued. Attempts that have been made up to now were simply directed toward reduction in the particle size to a nano scale, but there was not any research into a nanowire having a very large aspect ratio. The same is true of another electrochemical device, that is, a high-capacity capacitor.

A vital part in the upcoming research is how to control the shape of a metal oxide using a cost-efficient process. An electrode has conventionally been fabricated by a solid-state reaction at a high temperature of greater than several hundreds of degrees, giving an electrode structure in a micrometer scale. Presently, there are numerous method of forming nano-sized metal oxide, which are widely accepted in the academic and industrial fields, including template synthesis, evaporation, laser ablation, sputtering, chemical vapor deposition, physical vapor deposition, and so on, which are, however, quite poor in commercial viability. Even if a technique is commercially viable, it may be applied only to high-priced products.

In addition, a drawback to the conventional manganese oxide nano-structure growth technology is in that the aspect ratio of a nano-structure cannot be controlled. In order to utilize the nano-structure freely in forming a nano-device, it is necessarily possible to synthesize a nano-structure having a length adjustable according to necessity. Thus, controlling the aspect ratio of the nano-structure is crucial to nano-device applications. It is well known that electrode characteristics or catalytic activity of a metal oxide nano-structure are closely related with crystal forms or specific surface area of the nano-structure associated with the aspect ratio of the nano-structure.

Therefore, physical properties of the metal oxide can be optimized by controlling the aspect ratio of the nano-structure. In addition, hybrids of various molecules and metal oxide are necessary for nano-bio applications in the fields of, for example, drug carriers or DNA storage units. To this end, it is necessary to optimize an interaction between a target bio-molecule and metal oxide by adjusting a size of the metal oxide to be adapted to a size of the target bio-molecule.

BRIEF SUMMARY OF THE INVENTION

The present invention provides a method of controlling the aspect ratio of a nano-structure, by which the nano-structure is produced to have a size enough to demonstrate the optimal effect as needed in various fields of application, and a method of producing a nano-structure using the same.

The present invention also provides a nano-structure having the aspect ratio in which the optimal effect is demonstrated as needed in various fields of application.

In accordance with one embodiment of the present invention, there is provided a method of controlling the aspect ratio of a nano-structure, the method including preparing a mixed solution including a manganese salt and an oxidant, adding a pH controlling additive to the mixed solution and controlling a pH level of the mixed solution using the following equation, and heating the pH-controlled mixed solution at a temperature in a range of 50☐ to 200☐, preferably 100☐ to 200☐ for 1 hour to 10 days to cause a reaction to take place:

$$\text{Specific surface area } (m^2/g) = 0.2\, pH^2 + 2.$$

In accordance with another embodiment of the present invention, there is provided a method of producing a nano-structure, the aspect ratio of which is controlled by the method of controlling the aspect ratio of a nano-structure.

In accordance with still another embodiment of the present invention, there is provided a method of producing a lithium manganese oxide ($Li_xMn_2O_4$) nano-structure, the method including producing a manganese oxide nano-structure with the aspect ratio of which is controlled by the method of controlling the aspect ratio of a nano-structure according to the present invention; mixing the manganese oxide nano-structure and a lithium salt in organic solvent; and annealing the mixture at a temperature in a range of 300☐ to 700☐, preferably 500° C. to 600° C. for 1 hour to 10 days.

In accordance with a further embodiment of the present invention, there is provided a nano-structure produced by the method of producing a lithium manganese oxide nano-structure.

In the method of controlling the aspect ratio of a nano-structure, since the aspect ratio of the nano-structure can be easily controlled, the nano-structure having a desired specific surface area can be easily produced as needed in various fields of applications.

The produced manganese oxide and lithium manganese oxide can be effectively used in various fields of application, including a positive active material for a rechargeable battery, an electrode material for a storage battery, a redox catalyst, a molecule support, and so on.

Additional aspects and/or advantages of the invention will be set forth in part in the description which follows and, in part, will be obvious from the description, or may be learned by practice of the invention.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE INVENTION

Figure 1:
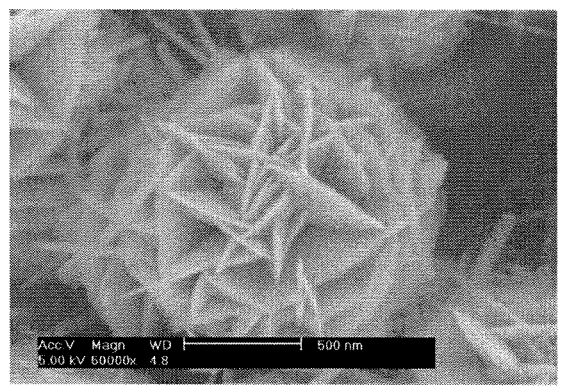
FIG. 1 is a scanning electron micrograph (SEM) image of a product prepared in Example 1.
Figure 2:
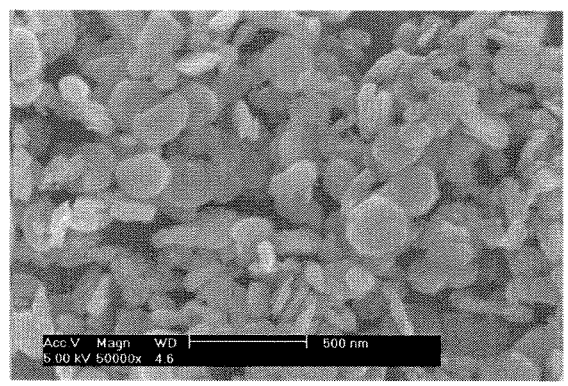
FIG. 2 is an SEM image of a product prepared in Example 2.
Figure 3:
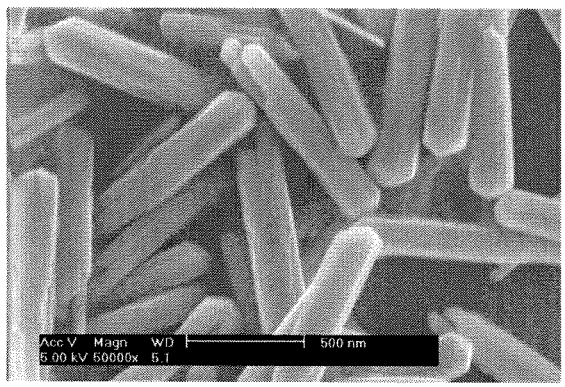
FIG. 3 is an SEM image of a product prepared in Example 3.
Figure 4:
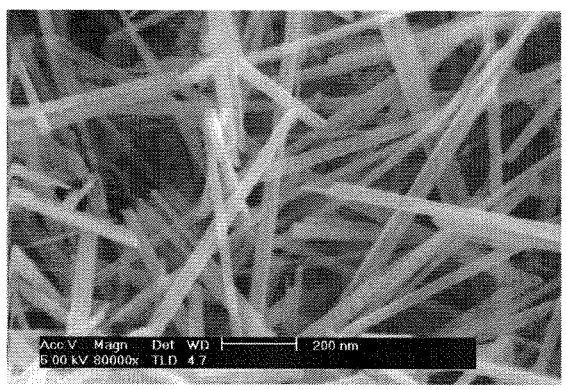
FIG. 4 is an SEM image of a product prepared in Example 6.

Hereinafter, embodiments of the present invention will be described in detail with reference to the accompanying drawings.

The present invention provides a method of controlling the aspect ratio of a nano-structure, including controlling a pH level of a reaction solution for producing the nano-structure using the Equation (1):

$$\text{Specific surface area (m}^2\text{/g)} = 0.2\,\text{pH}^2 + 2 \quad (1)$$

The nano-structure having a desired aspect ratio, that is, having a desired specific surface area, can be obtained by adjusting the pH level calculated based on the aspect ratio. The method of adjusting the pH level is optionally selected among various known methods by one skilled in the art according to reactant or target material.

According to one embodiment of the invention, the pH level of the reaction solution is adjusted to be in a range of 1 to 10.

The present invention will now be described in more detail. The method of controlling the aspect ratio of a nano-structure according to one embodiment of the invention, a method of producing a manganese oxide nano-structure using the controlling method, and a method of producing a lithium manganese oxide nano-structure will now be described step by step.

Step 1: Preparing Mixed Solution

A manganese salt and an oxidant are mixed in water at room temperature to adjust the pH level using the Equation (1).

Here, the manganese salt may be at least one metal salt selected from the group consisting of $MnSO_4$, $Mn(NO_3)_2$, $MnCl_2$, $Mn(CH_3COO)_2$ and hydrates thereof. The oxidant may be at least one compound selected from the group consisting of $(NH_4)_2S_2O_8$, $Li_2S_2O_8$, $Na_2S_2O_8$, and $K_2S_2O_8$.

Here, molar concentrations of the manganese salt and the oxidant may be in a range of 5 to 100 mM, respectively, and the manganese salt and the oxidant are preferably mixed in a molar ratio of 1:1 to 1:5.

If the oxidant is excessively added compared to the manganese salt, the shape of the produced oxide may differ, making it difficult to control the aspect ratio of the nano-structure. If a relatively small amount of the oxidant is added compared to the amount of the manganese salt, the yield of the desired nano-structure may be lowered. Thus, the oxidant is preferably added in an amount of 100 to 500 parts by weight based on 100 parts by weight of the manganese salt.

Here, a pH controlling agent, for example, $H_2SO_4$, $HNO_3$, HCl, $CH_3COOH$, NaOH or KOH, is added dropwise directly to the mixed solution, or to a strong aqueous solution of the mixed solution, in order to adjust the pH level of the solution. At this time, the pH is adjusted according to the Equation (1) to prepared to make the nano-structure having a desired specific surface area. Accordingly, the aspect ratio of the final nano-structure can be controlled.

Step 2: Production of Nano-Structure Using Hydrothermal Method

The aqueous solution prepared in step 1 is contained in a pressure-resistant, non-reactive glass or Teflon container and sealed. The reaction is allowed to take place at a temperature in a range of 50☐ to 200☐ for 1 hour to 10 days, to produce manganese oxide. After the production of manganese oxide is completed, the produced manganese oxide may be isolated from the reaction solution by a general precipitation method.

If the reaction temperature is too low or the reaction time is too short, the reaction is not sufficiently carried out, so that the nano-structure having a desired aspect ratio cannot be obtained. If the reaction temperature is too high or the reaction time is too long, the structure of the produced nano-structure may be deformed.

Step 3: Production of Nano-Structure Using Solid-State Method

The manganese oxide produced in step 2 is mixed with a lithium salt in an organic solvent, following by high-temperature annealing at a temperature in a range of 300☐ to 700☐ for 1 hour to 10 days to allow a solid-state reaction to take place, thereby producing the lithium manganese oxide maintaining the shape of the nano-structure.

Here, the lithium salt may be at least one compound selected from the group consisting of LiOH, $LiNO_3$, $Li_2CO_3$, $Li(CH_3O)$, $Li(CH_3CH_2O)$, $Li(CH_3COO)$, $Li_2O$ and hydrates thereof, and may be added in an amount of 10 to 200 parts by weight based on 100 parts by weight of manganese oxide. The x value in the produced lithium manganese oxide($Li_xMn_2O_4$) may vary according to the amount of lithium added. Therefore, the lithium manganese oxide nano-structure having a desired structure, as represented by a desired chemical formula can be easily produced.

According to the present invention, since the aspect ratio of the nano-structure can be easily controlled simply by adjusting the pH level, the nano-structure having a desired aspect ratio may also be easily produced. That is to say, the nano-structure according to the present invention can be can be used in various fields of application, including a positive active material for a rechargeable battery, an electrode material for a storage battery, a redox catalyst, a molecule support, and so on, while achieving the optimal effects.

The following examples illustrate the present invention in detail. These examples, however, should not in any sense be interpreted as limiting the scope of the present invention.

<Production of Manganese Oxide Nano-Structures>

Example 1

0.169 g of $MnSO_4 \cdot H_2O$ and 0.228 g of $(NH_4)_2S_2O_8$ were dissolved in 100 ml distilled water, and $H_2SO_4$ was added dropwise to adjust pH to 1. The reaction was allowed to take place in an oven at 130° C. for 10 hours by a hydrothermal method, followed by precipitation, thereby acquiring a solid. The acquired product was washed with distilled water several times and dried, yielding a manganese oxide $\beta MnO_2$.

Example 2

$\beta MnO_2$ was acquired by performing the same procedure as Example 1, except that $H_2SO_4$ was added to adjust pH to 3.

Example 3

$\beta MnO_2$ was acquired by performing the same procedure as Example 1, except that KOH was added to adjust pH to 5.

Example 4

$\beta MnO_2$ including some of $\gamma MnOOH$ was acquired by performing the same procedure as Example 1, except that KOH was added to adjust pH to 7.

Example 5

$\beta MnO_2$ including some of $\gamma MnOOH$ was acquired by performing the same procedure as Example 1, except that KOH was added to adjust pH to 9.

Example 6

$\gamma MnOOH$ including some of $\beta MnO_2$ was acquired by performing the same procedure as Example 1, except that KOH was added to adjust pH to 10.

Example 7

$\beta MnOOH$ was acquired by performing the same procedure as Example 1, except that KOH was added to adjust pH to 12.

Example 8

The solid material acquired in Example 6 was annealed in the air at 300° C. for 3 hours, yielding a black solid material $\beta MnO_2$.

Comparative Example 1

0.169 g of $MnSO_4 \cdot H_2O$ and 0.228 g of $(NH_4)_2S_2O_8$ were dissolved in 100 ml distilled water, and KOH was added dropwise to adjust pH to 10. The reaction was allowed to stand at room temperature for 10 hours, followed by precipitation, thereby acquiring a solid. The acquired product was washed with distilled water several times and dried, yielding a solid material.

<Production of Lithium Manganese Oxide Nano-Structure>

Example 9

0.002 mol of the solid material acquired in Example 8 and 0.001 mol of $LiOH \cdot H_2O$ were mixed with a trace of ethanol to prepare a slurry. The slurry was annealed in the air at 600° C. for 10 hours, yielding $LiMn_2O_4$ as a black solid material.

In Examples 1 to 7, $H_2SO_4$ or KOH was added to an aqueous solution including $MnSO_4 \cdot H_2O$ and $(NH_4)_2S_2O_8$ in a molar ratio of 1:1, thereby adjusting a pH level of the aqueous solution, followed by a hydrothermal process, yielding a manganese oxide. SEM images of the products acquired in Examples 1 to 7 by heating at 130□ under conditions of pH 1, pH 3, pH5 and pH 10 are shown in FIGS. 1 to 4. As shown in FIGS. 1 to 4, the produced manganese oxide nano-structures have different aspect ratios according to the pH level of the aqueous solution. When the pH level is 1, a plate-shaped manganese oxide was obtained. When the pH level is 3, a coin-shaped manganese oxide was obtained. When the pH level is 5, a nanorod-shaped manganese oxide was obtained. When the pH level is 10, a nanowire-shaped manganese oxide was obtained.

Figure 7:
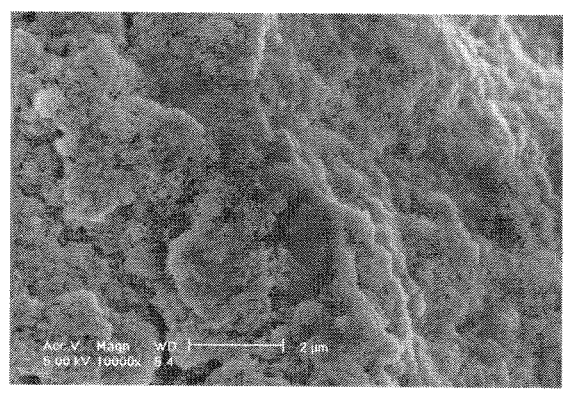
FIG. 7 is an SEM image of a product prepared in Comparative Example 1.

In Comparative Example 1 in which the reaction is allowed to stand at room temperature without heating, an amorphous oxide, as shown in FIG. 7, is obtained.

Figure 8:
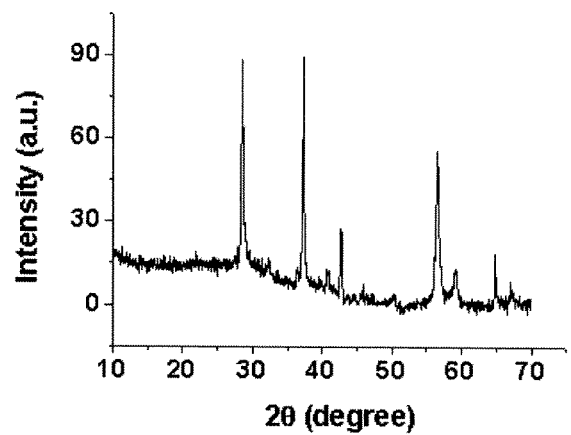
FIG. 8 is a graph illustrating X-ray diffraction (XRD) analysis results of the product prepared in Example 3.
Figure 9:
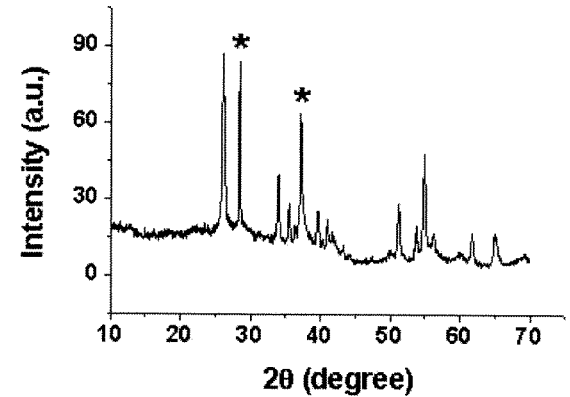
FIG. 9 is a graph illustrating XRD analysis results of the product prepared in Example 6.

As confirmed from the XRD analysis result, $\beta MnO_2$ was obtained from the manganese oxide produced under a pH 5 condition (see FIG. 8), and $\gamma MnOOH$ containing some of $\beta\text{-}MnO_2$, as marked with an asterisk, was obtained under a pH 10 condition (see FIG. 9).

Figure 5:
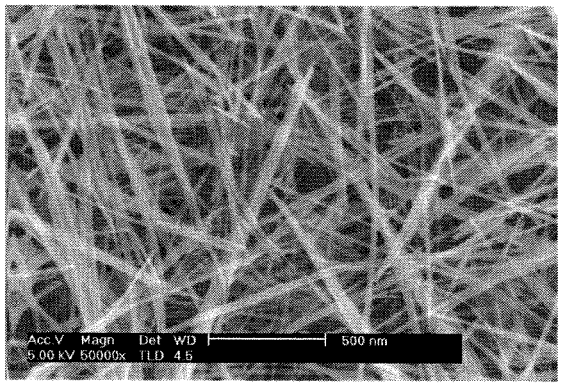
FIG. 5 is an SEM image of a product prepared in Example 8.
Figure 10:
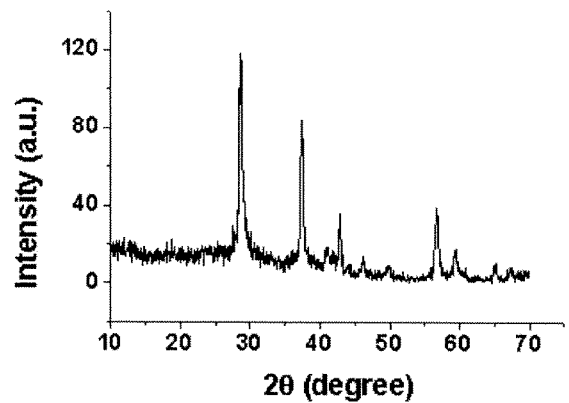
FIG. 10 is a graph illustrating XRD analysis results of the products prepared in Example 8.

If the manganese oxide produced under a pH 10 condition is annealed at 300° C., nanowire shapes are maintained, as shown in FIG. 5, and pure $\beta\text{-}MnO_2$ is obtained, as confirmed from the XRD analysis result shown in FIG. 10.

That is to say, $\beta MnO_2$ having a small aspect ratio is produced at pH 5 or less, and $\beta MnO_2$ having a large aspect ratio is produced by producing $\gamma MnOOH$ having a large aspect ratio at a high pH level and then by annealing the same.

Therefore, the nano-structure having a desired aspect ratio can be easily produced by adjusting a pH level.

Figure 6:
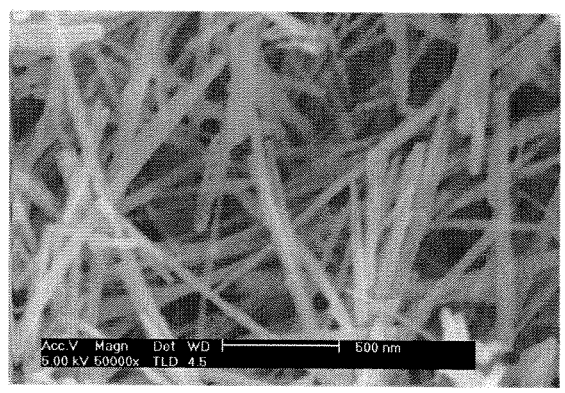
FIG. 6 is an SEM image of a product prepared in Example 9.
Figure 11:
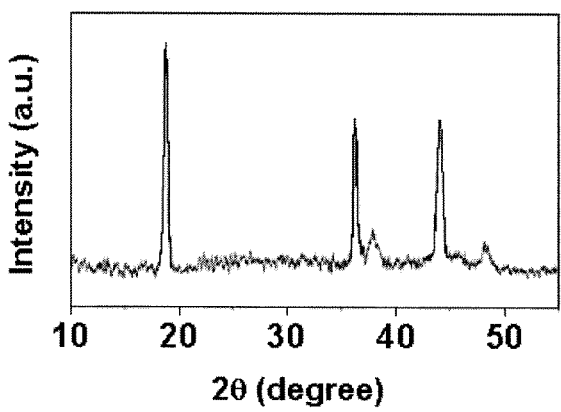
FIG. 11 is a graph illustrating XRD analysis results of the products prepared in Example 9.

2 equivalents of $\beta\text{-}MnO_2$ and 1 equivalents of $LiOH \cdot H_2O$ are mixed and annealed at a high temperature of approximately 600° C. As a result, as shown in FIG. 6, nanowire shapes are maintained, and pure $LiMn_2O_4$ is obtained, as confirmed from the XRD analysis result shown in FIG. 11.

Figure 12:
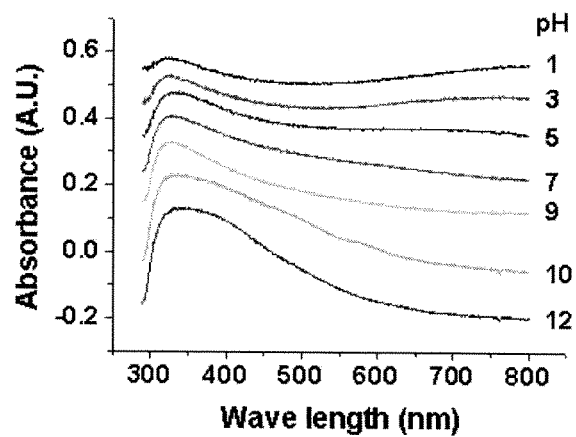
FIG. 12 is a graph illustrating absorbance spectrum results of the products prepared in Examples 1 to 7.
Figure 13:
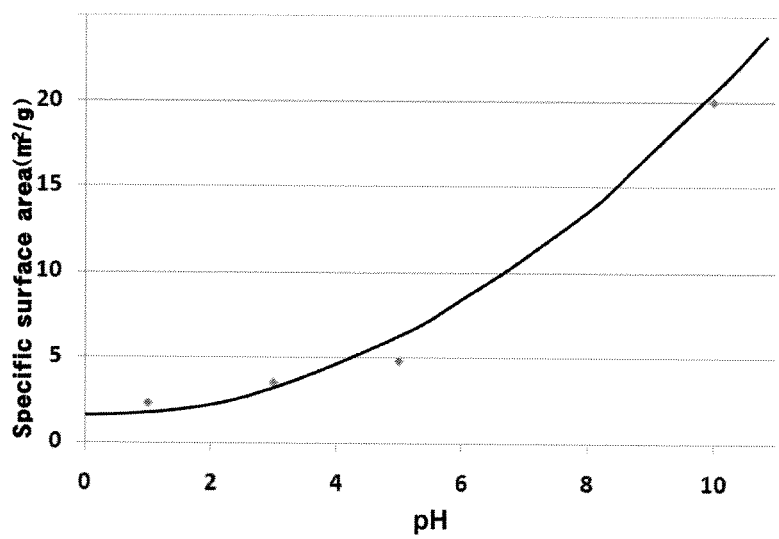
FIG. 13 is a graph illustrating correlation between pH and specific surface area of a nano-structure.

FIG. 12 illustrates absorbance spectrum results of the products prepared in Examples 1 to 7. When the aqueous solution is at pH 1, $\beta MnO_2$ is yielded as a black manganese oxide. As the pH level increases, $\gamma MnOOH$ is yielded as a brown manganese oxide. The nano-structure is expected to undergo the change of shape from a plate to a coin, to a rod and to a nanowire with variation of the composition ratio of $\beta MnO_2$ to $\gamma MnOOH$ in the manganese oxide produced after the reaction is completed. The thus-produced manganese oxide and lithium salt are annealed at a high temperature, thereby giving lithium manganese oxide maintaining a nano-structure shape.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims.

What is claimed is:

1. A method of controlling the aspect ratio of a nano-structure, the method comprising:
   preparing a mixed solution including a manganese salt and an oxidant;
   adding a pH controlling additive to the mixed solution and controlling a pH level of the mixed solution using the following equation; and
   heating the pH-controlled mixed solution at a temperature in a range of 50° C. to 200° C. for 1 hour to 10 days to cause a reaction to take place:

Specific surface area $(m^2/g) = 0.2 \, pH^2 + 2$.

2. The method of claim 1, wherein the manganese salt is at least one metal salt selected from the group consisting of $MnSO_4$, $Mn(NO_3)_2$, $MnCl_2$, $Mn(CH_3COO)_2$ and hydrates thereof.

3. The method of claim 1, wherein the oxidant is at least one compound selected from the group consisting of $(NH_4)_2S_2O_8$, $Li_2S_2O_8$, $Na_2S_2O_8$, and $K_2S_2O_8$.

4. The method of claim 1, wherein the pH controlling additive is at least one compound selected from the group consisting of $H_2SO_4$, $HNO_3$, HCl, $CH_3COOH$, LiOH, NaOH, and KOH.

5. The method of claim 1, wherein 100 to 500 parts by weight of the oxidant is added based on 100 parts by weight of the manganese salt.

6. A method of producing a nano-structure, the aspect ratio of which is controlled by the method claimed in any one of claims 1 to 5.

7. A method of producing a lithium manganese oxide nano-structure, the method comprising:
   producing a manganese oxide nano-structure, the aspect ratio of which is controlled by the method claimed in any one of claims 1 to 5;
   mixing the manganese oxide nano-structure and a lithium salt in an organic solvent; and
   annealing the mixture at a temperature in a range of 300° C. to 700° C. for 1 hour to 10 days.

8. The method of claim 7, wherein the lithium salt is at least one selected from the group consisting of LiOH, $LiNO_3$, $Li_2CO_3$, $Li(CH_3O)$, $Li(CH_3CH_2O)$, $Li(CH_3COO)$, $Li_2O$ and hydrates thereof.

9. The method of claim 7, wherein 10 to 200 parts by weight of the lithium salt is added based on 100 parts by weight of the manganese oxide nano-structure.

* * * * *